Jan. 14, 1958     K. J. KOLLMANN     2,819,480

TRAP SPOON

Filed Sept. 16, 1954     2 Sheets-Sheet 1

*INVENTOR.*
KARL J. KOLLMANN
BY
*Charles L. Lovenchuck*

Jan. 14, 1958   K. J. KOLLMANN   2,819,480
TRAP SPOON
Filed Sept. 16, 1954   2 Sheets-Sheet 2

INVENTOR.
KARL J. KOLLMANN
BY
Charles L. Loverchek

United States Patent Office 2,819,480
Patented Jan. 14, 1958

2,819,480

TRAP SPOON

Karl J. Kollmann, Erie, Pa.

Application September 16, 1954, Serial No. 456,592

2 Claims. (Cl. 15—104.3)

This invention relates to plumbing equipment and more particularly to tools for guiding plumbing snakes around corners in conduits and into the desired channels in branch pipes, traps, conduits, tubing, etc.

In the process of cleaning drainage pipes, sewer pipes, and the like, it is common practice to use a cutting tool on the end of a flexible shaft to open the pipe. The flexible shaft is frequently known as a "plumber's snake." The plumber or person operating the snake inserts it in the pipe to be cleaned and forces it through the pipe until the cutter on the end of the snake comes into engagement with the obstruction. The cutter is rotated continuously during the movement of the snake through the pipe in order for the cutter to cut through and remove the obstruction. In pipes which are made up of a continuous channel, no problem is usually encountered in causing the snake to progress through the pipe, even though curves, bends, and corners are encountered. The cutter will usually find its way through. Difficulty is sometimes encountered, however, in directing the snake into the proper channel where a T-joint or Y or other branch joint is encountered because the snake is inclined to travel through the path of least resistance and may enter the channel easiest to enter rather than the desired channel.

It is, accordingly, an object of this invention to overcome the above and other defects in the use of prior pipe cleaners and, more particularly, to provide a means for guiding and directing a plumber's snake through a pipe channel, or conduit.

A further object of the invention is to provide a trap spoon which is simple in construction, economical to manufacture, and simple and efficient to use.

Another object of the invention is to provide a novel type of trap spoon.

A still further object of the invention is to provide a trap spoon made up of a rigid handle having a foldable directing spoon pivotally attached thereto.

A still further object of this invention is to provide a trap spoon wherein a spoon member is pivotally and adjustbly attached to a handle.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Figs. 1, 2, and 3 are cross sectional views of plumbing traps showing the trap spoon in various positions leading to the insertion thereof into direct position in the pipe;

Figure 1:
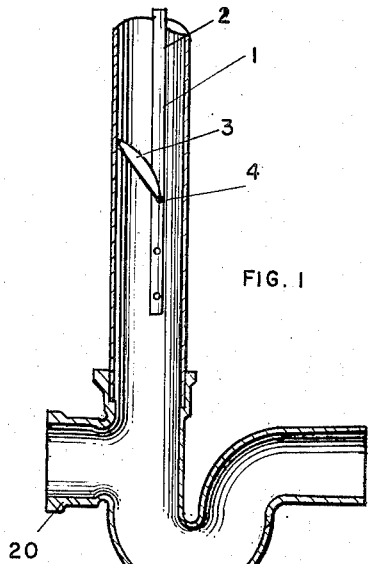

Now with more specific reference to the drawings, I show a trap spoon 1 having an elongated handle 2 and a spoon 3 pivotally attached to the handle 2 by means of a pin 4 which is inserted through one of the holes 5 in the handle 2 and through similar holes in the ears 40 and 41 on the spoon 3. The pin 4 is preferably made of a cotter pin having two legs 6 and 7 which are connected by the eye portion 8. The spoon 3 has a generally oval shaped body portion 10 having a slot 11 to receive the handle member 2. Each ear of the spoon 3 is preferably bent at 12 to form an eye 13 which is adapted to receive the pin 4.

Figure 2:
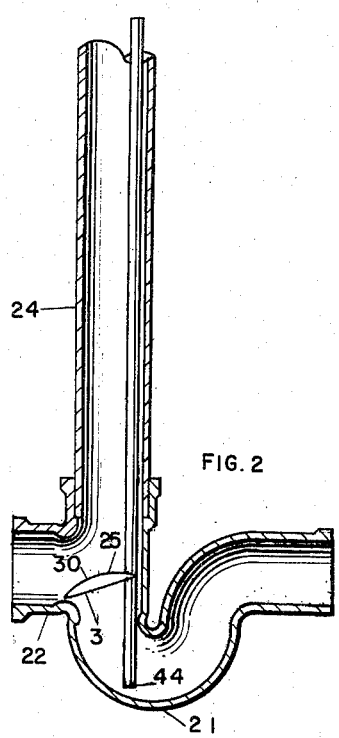
Figure 3:
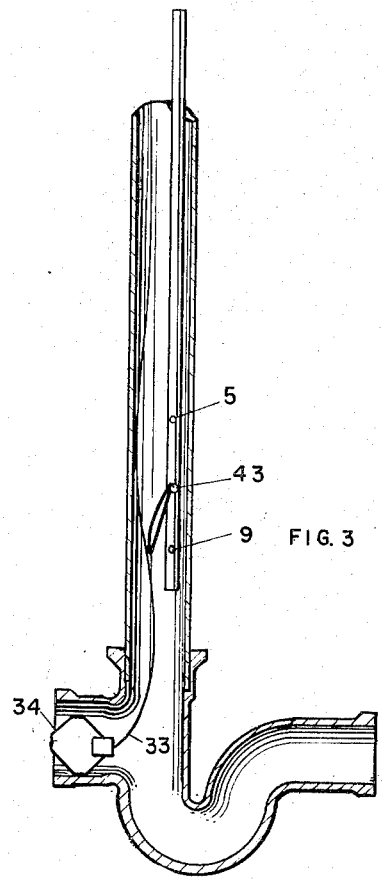
Figures 4, 5:
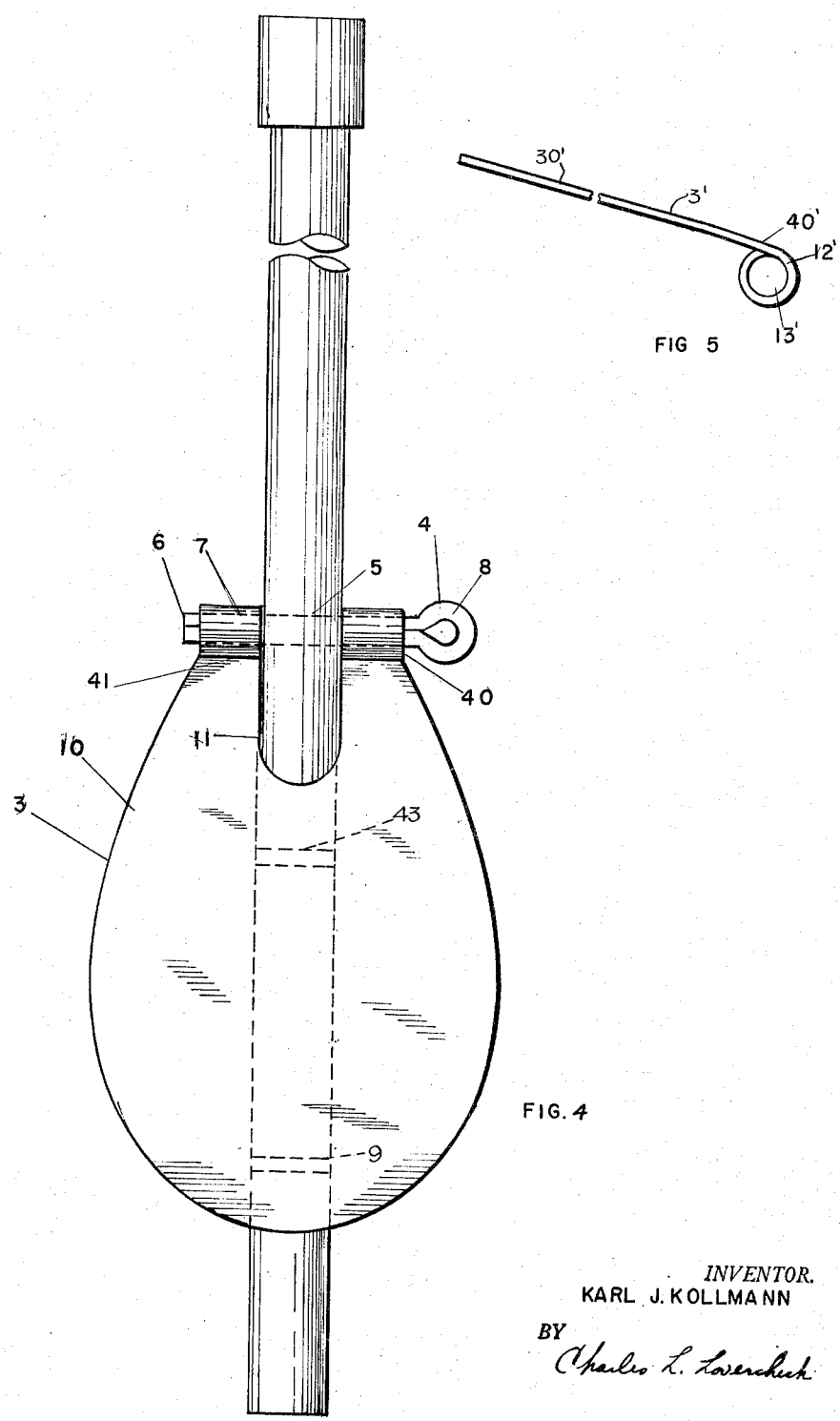
Fig. 4 is an enlarged view of the trap spoon.
Fig. 5 is a partial side view of another form of the trap spoon, shown in Fig. 4.

The spoon portion 3 is generally plate shaped and it can have an upwardly facing convex portion 30. This curved configuration of the spoon member 3 makes it easier for the snake 33 to guide the cutter 34 thereof to slide along the spoon 3 into the pipe branch desired. The spoon 3 may swing to a position generally parallel to the handle 2 as shown in Fig. 1 to a position generally perpendicular thereto as shown in Fig. 2. While generally parallel, it is much easier to insert the spoon 3 into the pipe and it becomes easier to remove it and, at the perpendicular position shown in Fig. 2, the spoon 3 forms a directing platform for moving the cutter 34 into the pipe. The embodiment of the invention shown in Fig. 5 is similar to the embodiment shown in Figs. 1, 2, 3, and 4 with a prime added to the numerals to distinguish them; however, spoon 3' is flat.

During operation, the operator will connect the spoon 3 to the handle 2 by means of cotter pin 4 and insert the handle 2 into a pipe where it is desired to direct a cutter member 34 on a snake 33 into a branch such as the branch 20 shown. The spoon 3 may lie back along the handle 2 as shown in Fig. 1 during the insertion thereof. The spoon 3 will be pivoted to the handle 2 to the proper hole 5, 43, or 9 as required by the distance of the portion 21 below the opening 22 in the trap or pipe so that when the spoon 3 is in the operating position, it will be in approximately the position shown in Fig. 2 with the lower end 44 of the handle 2 in engagement with the bottom of the trap at 21, thereby providing a fixed support for the trap spoon 3. The snake 33 is then inserted into the trap in the regular manner and it will pass down through the body portion 24 of the pipe until it comes in contact with the upper surface of the spoon 3 whereby it will be directed into the opening 22 instead of passing on down through the trap surface 21 which would normally occur if the spoon 3 were not used. The operator can then pull the trap spoon 3 back outwardly and the spoon portion 3 will hang down along the handle 2 in the position shown in Fig. 3 for removal of the spoon 3. Thereafter, the snake 33 will be rotated and further inserted into the pipe in a desired and conventional manner to remove the obstruction.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A trap spoon for directing a plumber's snake into a lateral branch pipe comprising an elongated handle, a plurality of transverse longitudinally spaced holes in said handle, an oval shaped plate, a slot in one edge of said plate receiving said handle therein, aligned eyes formed in said plate at each side of said slot, the axes of which are generally parallel to one surface of said plate, and removable pintle means extending through said eyes and a selected one of said holes whereby said plate is adapted to swing from a position generally parallel to said handle to a position generally perpendicular thereto, one end of said handle being adapted to rest on the bottom of a trap and the distal end of said plate being adapted to rest on the lower edge of a lateral branch pipe opening to deflect a plumber's snake thereinto.

2. The trap spoon recited in claim 1 wherein one surface of said plate is convex.

References Cited in the file of this patent

UNITED STATES PATENTS

| | | |
|---|---|---|
| 973,537 | Miller | Oct. 25, 1910 |
| 1,225,739 | Adler | May 15, 1917 |
| 1,408,472 | Rohder | Mar. 7, 1922 |
| 1,824,924 | Paul et al. | Sept. 29, 1931 |
| 1,865,853 | Granville | July 5, 1932 |